United States Patent
Cheng et al.

(10) Patent No.: US 11,119,001 B2
(45) Date of Patent: Sep. 14, 2021

(54) MACHINE TOOL HEALTH MONITORING METHOD

(71) Applicants: NATIONAL CHUNG CHENG UNIVERSITY, Min-Hsiung (TW); TONGTAI MACHINE & TOOL CO., LTD., Kaohsiung (TW)

(72) Inventors: Chih-Chun Cheng, Min-Hsiung (TW); Yu-Sheng Chiu, Min-Hsiung (TW); Wen-Nan Cheng, Min-Hsiung (TW); Ping-Chun Tsai, Min-Hsiung (TW); Yu-Hsin Kuo, Min-Hsiung (TW); Wei-Jen Chen, Min-Hsiung (TW); De-Shin Liu, Min-Hsiung (TW); Chen-Wei Chuang, Min-Hsiung (TW); Chih-Ta Wu, Min-Hsiung (TW); Wen-Peng Tseng, Kaohsiung (TW); Wen-Chieh Kuo, Kaohsiung (TW)

(73) Assignees: NATIONAL CHUNG CHENG UNIVERSITY, Chia-Yi County (TW); TONGTAI MACHINE & TOOL CO., LTD., Kaohsiung (TW)

( * ) Notice: Subject to any disclaimer, the term of this patent is extended or adjusted under 35 U.S.C. 154(b) by 0 days.

(21) Appl. No.: 16/810,251

(22) Filed: Mar. 5, 2020

(65) Prior Publication Data
US 2021/0123830 A1    Apr. 29, 2021

(30) Foreign Application Priority Data
Oct. 24, 2019 (TW) .................................. 108138447

(51) Int. Cl.
*G01M 5/00* (2006.01)

(52) U.S. Cl.
CPC ........ *G01M 5/0066* (2013.01); *G01M 5/0041* (2013.01)

(58) Field of Classification Search
CPC .......................... G01M 5/0066; G01M 5/0041
(Continued)

(56) References Cited

U.S. PATENT DOCUMENTS

| 2018/0130489 A1* | 5/2018 | Cheng | B23Q 15/12 |
| 2018/0196014 A1* | 7/2018 | Mann, III | G01M 5/0066 |
| 2019/0162704 A1* | 5/2019 | Cheng | G01N 29/46 |

OTHER PUBLICATIONS

Nikolaos et al. "Modal Analysis, Jan. 2015", (Year: 2015).*
(Continued)

*Primary Examiner* — Catherine T. Rastovski
*Assistant Examiner* — Aeysha N Sultana
(74) *Attorney, Agent, or Firm* — Muncy, Geissler, Olds & Lowe, P.C.

(57) ABSTRACT

A machine tool health monitoring method which is to use a predetermined plurality of vibration sensors on a plurality of components of a machine tool and to drive motors of the machine tool to excite the machine tool using an electronic device while the health status of the machine tool is good, and then to perform a diagnostic process to obtain a characteristic cluster consisting of a plurality of modals, and then to define the characteristic cluster as a sample health characteristic cluster. The diagnostic process includes the procedures of vibration transmissibility obtaining, singular value decomposition, curve fitting and modal establishing. In addition, excite the machine tool and proceed the diagnosis process to obtain a current health characteristic cluster. Finally, the current health characteristic cluster is compared with the sample health characteristic cluster to judge whether the machine tool is healthy or not.

3 Claims, 7 Drawing Sheets

(58) Field of Classification Search
USPC .......................................................... 702/34
See application file for complete search history.

(56) References Cited

OTHER PUBLICATIONS

J.S. Lamancusa "Vibration Isolation", 2002 (Year: 2002).*
Devriendt et al (Devriendt, Christof, and Patrick Guillaume. "Identification of modal parameters from transmissibility measurements." Journal of Sound and Vibration 314.1-2 (2008): 343-356.) (Year: 2008).*

* cited by examiner

MACHINE TOOL HEALTH MONITORING METHOD

BACKGROUND OF THE INVENTION

1. Field of the Invention

The present invention relates to machine tool monitoring technology and more particularly, to a machine tool health monitoring method.

2. Description of the Related Art

With the rapid development of machine tools, the demand for information on the health status of machine tools is obtaining higher and higher. In general, the health status can be subdivided into dynamic state and service life, wherein the dynamic state is most affected by machine assembly and environmental factors. When assembling the machine, it is mainly to perform human adjustment by using instruments such as spirit level and torque wrench. However, it is impossible to know the quality of the assembled state by human adjustment, and it is impossible to effectively check whether the assembly of each component is bad. Due to that the client environment is different from the original factory, the environmental factor makes the machine tool unable to play the same machine characteristics as the original factory adjustment, resulting in the problem that the processing quality of the machine tool is lower than the original factory and the service life is shortened. Among them, the influence of the differences between the client and the original factory on environment foundation and temperature is the most significant. The dynamic characteristics of the machine will also affect the service life of the machine. Each part of the machine tool will wear out due to the use of the machine tool. Therefore, if the health status of the machine tool can be known early by monitoring and diagnosis, the utilization rate, processing quality and efficiency of the machine tool can be improved, and the maintenance cost and time can be saved.

In the prior art, the vibration-based measurement technology is mostly used to obtain the healthy status of a machine tool. The advantages of this method are rapid measurement, high sensitivity to the health status of the machine, and low diagnostic cost. Therefore, warning messages can be issued early to alert the user in the early stage of poor or damaged machine assembly. The health status diagnosis of the aforementioned vibration-based measurement technology is often analyzed in two ways. The first method is the structural feature quantization method, which is to calculate the frequency response function of the dynamic characteristics of the machine according to the vibration background, and to obtain the natural frequency, damping ratio and modal parameters from the frequency response function. Because the dynamic characteristics of the machine is highly sensitive to the health status of the machine, it is often used as an indicator of health status. However, this method requires a vibration exciter, for example, an impact hammer or a shaker, and at the same time, it is necessary to rely on a professional to use the impact hammer for artificial excitation, and the input power must be measured. Therefore, this method requires a lot of manpower and time, so it is not conducive to diagnostic automation and intelligence. The second method is the non-structural feature quantization method. This method is to extract the vibration signal information that belongs to the specific frequency characteristics of the operation of the machine tool and analyzes the health status by statistical analysis. However, its shortcoming is that it takes a lot of time to collect data and establish a database, and because it often needs to re-establish the machine tool health database after the machine tool is transferred, it is impossible to immediately diagnose the health status of the machine tool.

SUMMARY OF THE INVENTION

The present invention has been accomplished under the circumstances in view. It is the main object of the present invention to provide a machine tool health monitoring method, which uses each motor device of the machine tool to excite the machine tool, and can extract the vibration transmissibility, the natural frequency and the modal health characteristics without manual vibration, thereby judging the health status of the machine tool.

To achieve this and other objects of the present invention, a machine tool health monitoring method comprises the steps of obtaining a sample health characteristic cluster, obtaining a current health characteristic cluster and judging the health status. The step of obtaining a sample health characteristic cluster is to use a predetermined plurality of vibration sensors on a plurality of components of a machine tool and to drive the motors of the machine tool to excite the machine tool using an electronic device while the health status of the machine tool is good, and then to perform a diagnostic process during the excitation process so as to obtain a characteristic cluster consisting of a plurality of modals, and then to define the characteristic cluster as a sample health characteristic cluster. The diagnostic process comprises a vibration transmissibility obtaining procedure, a singular value decomposition procedure, a curve fitting procedure and a modal establishing procedure. The vibration transmissibility obtaining procedure is to use the electronic device to read the data sensed by the plurality of vibration sensors every predetermined period of time, and to calculate the multiple vibration transmissibilities $T_{ij}$ measured by the plurality of vibration sensors according to formula (1), where i and j respectively represent the vibration sensors installed in different locations, $$T_{ij}(s) = \frac{\sum_{k=1}^{N} H_{ik}(s)F_k(s)}{\sum_{k=1}^{N} H_{jk}(s)F_k(s)} \quad \text{formula (1)}$$

where $H_{ik}(s)$ and $H_{jk}(s)$ are transfer functions, and the transfer function is shown in formula (2) (taking $H_{ik}(s)$ as an example);

$$H_{ik}(s) = \sum_{r=1}^{N} \left( \frac{\phi_{ir}L_{kr}}{i\omega - \lambda_r} + \frac{\phi_{ir}^* L_{kr}^*}{i\omega - \lambda_r^*} \right) \quad \text{formula (2)}$$

where φ is the modal vector, L is the modal participation factor, λ is the pole of the system, and resonance occurs when iω approaches the pole of the system, at which point the formula (1) will become the formula (3) described below:

$$\lim_{s\to\lambda_r} T_{ij}(s) = \frac{\sum_{k=1}^{N} \phi_{ir}L_{kr}}{\sum_{k=1}^{N} \phi_{jr}L_{kr}} = \frac{\phi_{ir}}{\phi_{jr}}.\quad\text{formula (3)}$$

The singular value decomposition procedure is to combine the plurality of vibration transmissibilities $T_{ij}$ into a vibration transmissibility matrix as shown in the following formula (4), and then to use the singular value decomposition method to decompose the vibration transmissibility matrix by the following formula (5) so as to obtain the singular value of the vibration transmissibility matrix, $$T(s) = \begin{bmatrix} T_{12}^1(s) & T_{12}^2(s) & \dots & T_{12}^k(s) \\ T_{13}^1(s) & T_{13}^2(s) & \dots & T_{13}^k(s) \\ \vdots & \vdots & \ddots & \vdots \\ T_{ij}^1(s) & T_{ij}^2(s) & \dots & T_{ij}^k(s) \\ 1 & 1 & \dots & 1 \end{bmatrix} \quad\text{formula (4)}$$

$$T(s) = U(s)\Sigma(s)V^T(s) \quad\text{formula (5)}$$

where U and V are unit orthogonal matrices, $\Sigma$ is an oblique diagonal matrix, and $\Sigma(s)$ is as shown in formula (6), $$\Sigma(s) = \begin{bmatrix} \sigma_1(s) & 0 & \dots & 0 \\ 0 & \sigma_2(s) & \dots & 0 \\ \vdots & \vdots & \ddots & \vdots \\ 0 & 0 & \dots & \sigma_k(s) \end{bmatrix} \quad\text{formula (6)}$$

where the diagonal element $\sigma_k(s)$ in the above formula (6) is the singular value.

The curve fitting procedure is to take the reciprocal of $\sigma_2$ in formula (6) and to perform a curve fitting procedure and then to define the multiple peaks of the fitted curve as natural frequencies.

The modal establishing procedure is based on the plurality of natural frequencies to establish a plurality of current modals $\varphi_h$ of the machine tool according to the following formula (7). Each current modal takes a $\varphi_h$ as an example.

$$\varphi_h = [-1\ 0\ 1]^T \quad\text{formula (7)}$$

where the plurality of current modals $\varphi_h$ are defined as a characteristic cluster.

The step of obtaining a current health characteristic cluster is to use the electronic device to drive the motors of the machine tool for exciting the machine tool after a predetermined time has elapsed in the step of obtaining a sample health characteristic cluster and then to perform the diagnostic process during the excitation process so as to obtain a characteristic cluster composed of a plurality of modals $\varphi_h$, and then to define the characteristic cluster as a current health characteristic cluster.

The step of judging the health status is to compare the current health characteristic cluster with the sample health characteristic cluster, and to determine that the current state of the machine tool is unhealthy when the difference is greater than a safety threshold, otherwise it is judged to be healthy.

Through the above steps, the present invention can excite the machine tool by using the motors of the machine tool itself, and can extract the vibration transmissibility, the natural frequency, and the modal health characteristics without manual vibration, thereby judging the health status of the machine tool.

Other advantages and features of the present invention will be fully understood by reference to the following specification in conjunction with the accompanying drawings, in which like reference signs denote like components of structure.

DETAILED DESCRIPTION OF THE INVENTION

Referring to FIGS. 1-7, the invention provides a machine tool health monitoring method, which comprises the steps of (S01) obtaining a sample health characteristic cluster, (S02) obtaining a current health characteristic cluster and (S03) judging the health status.

Figure 1:
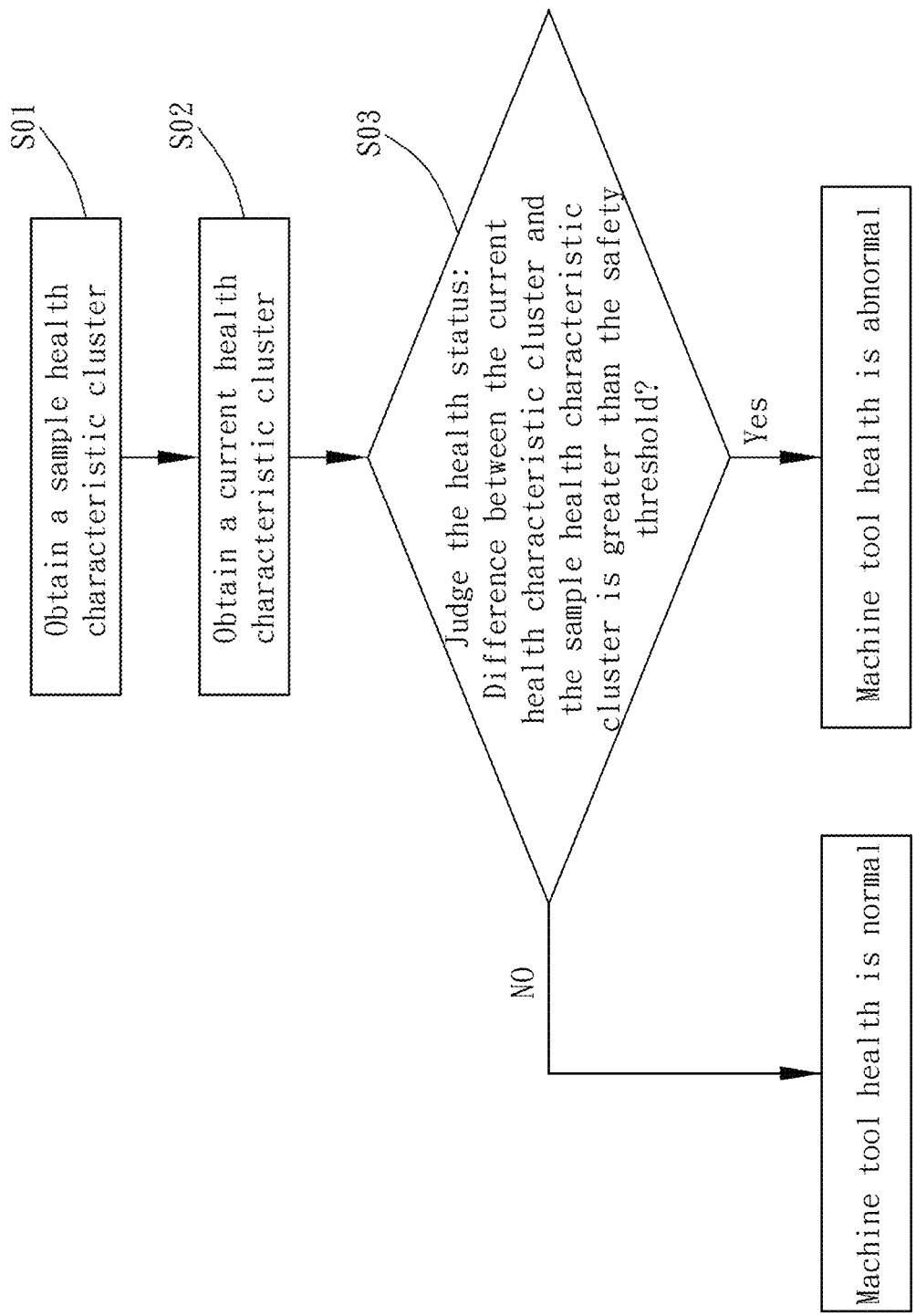
FIG. 1 is a flow chart of a machine tool health monitoring method in accordance with the present invention.
Figure 2:
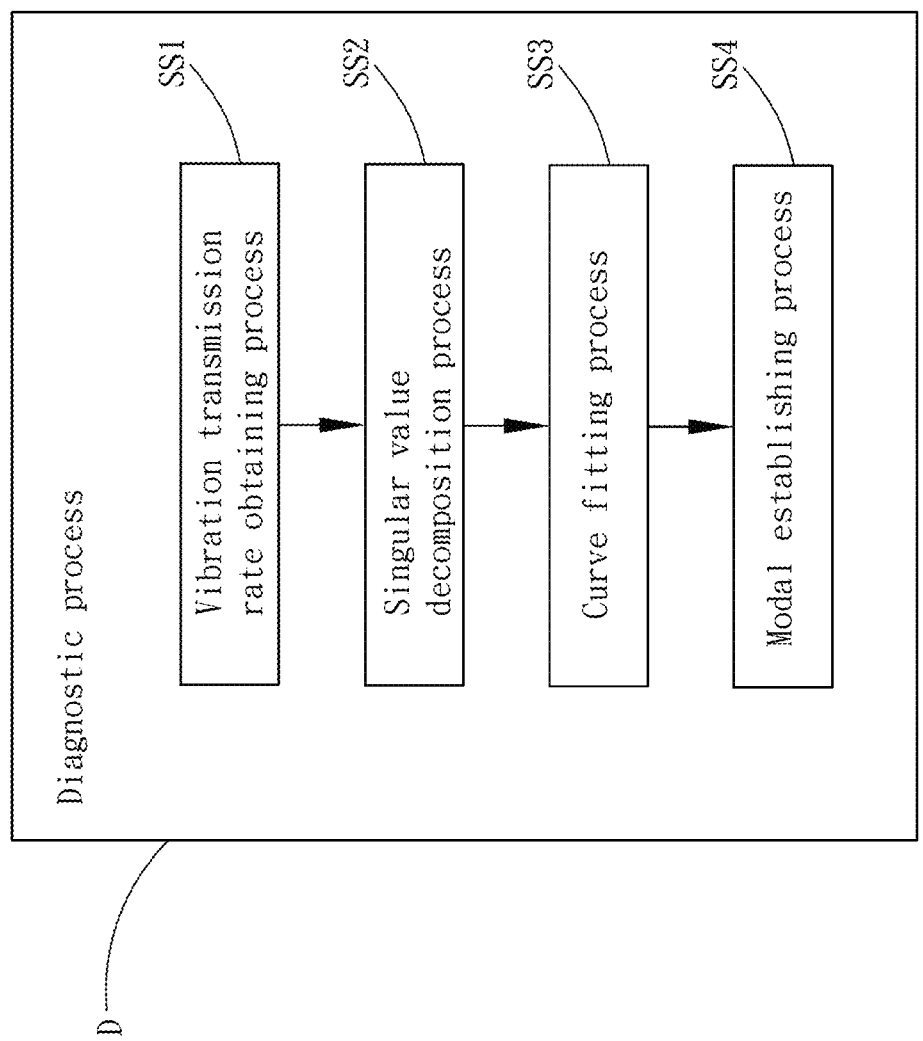
FIG. 2 is a flow chart of the diagnostic process.
Figure 3:
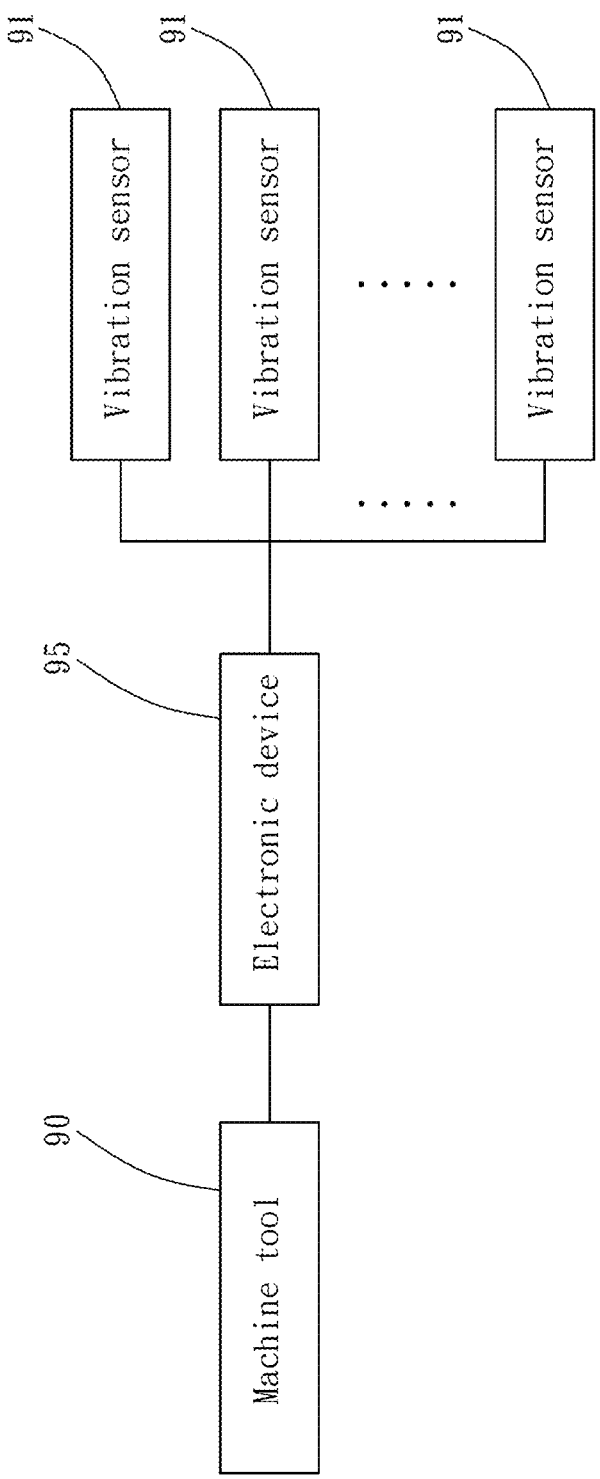
FIG. 3 is a block diagram of the present invention.
Figure 4:
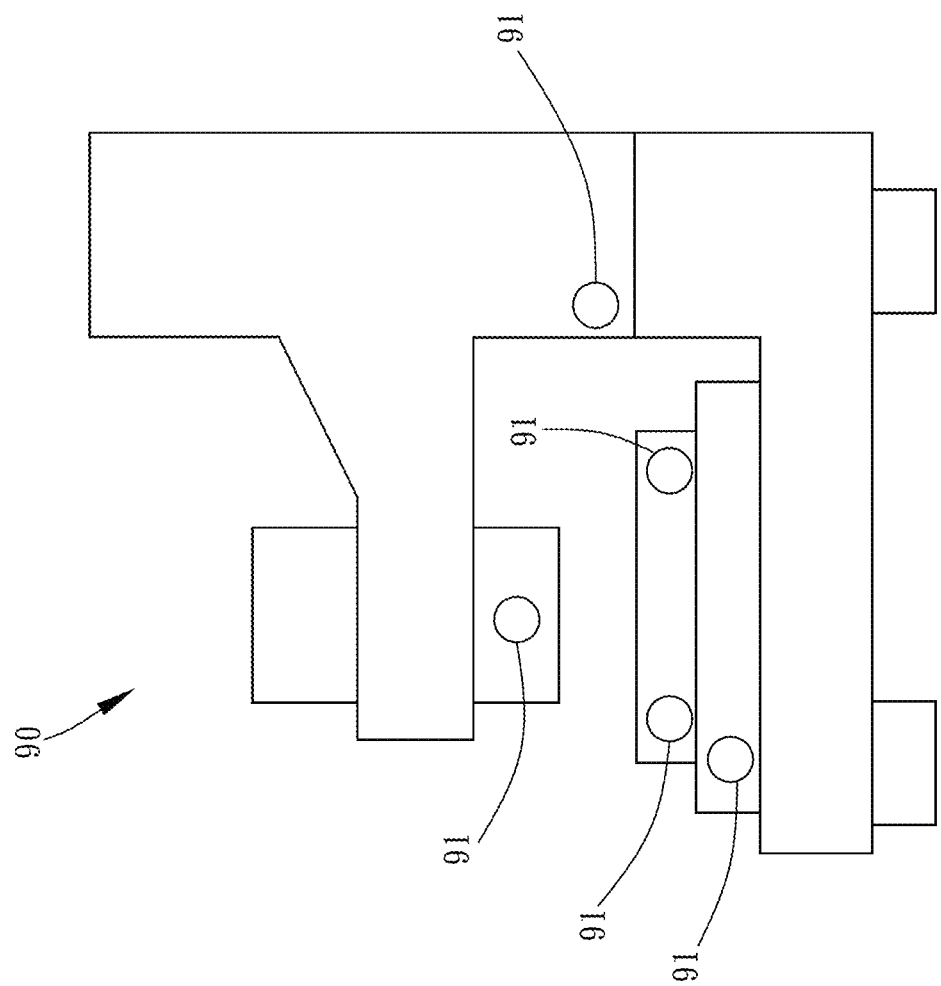
FIG. 4 is a schematic drawing of the present invention, showing the vibration sensors mounted on the machine tool.

In Step (S01) obtaining a sample health characteristic cluster, using a predetermined plurality of vibration sensors 91 on a plurality of components (for example, a spindle, a feed platform) of a machine tool 90, the motors of the machine tool 90 are driven by an electronic device 95 to excitate the machine tool 90 while the health status of the machine tool 90 is good, and a diagnostic process D is performed during the excitation process. By performing the diagnostic process D, a characteristic cluster consisting of a plurality of modals $\varphi_h$ is obtained, and the characteristic cluster is defined as a sample health characteristic cluster SG. The diagnostic process D, as shown in FIG. 2, comprises the following procedures: (SS1) vibration transmissibility obtaining, (SS2) singular value decomposition, (SS3) curve fitting, and (SS4) modal establishing. The health status of the machine tool 90 is good, which means that the machine tool 90 has just been assembled and adjusted to the best state, or the machine tool 90 is adjusted to a good state after repair and maintenance. It is not limited to the state that the machine tool 90 has just been shipped from the factory or the user has been using the machine tool 90 for a while.

The procedure (SS1) vibration transmissibility obtaining is performed by: using the electronic device 95 to read the data sensed by the plurality of vibration sensors 91 every predetermined period of time, and calculating the multiple vibration transmissibilities $T_{ij}$ measured by the plurality of vibration sensors 91 according to formula (1), where i and j respectively represent the vibration sensors 91 installed in different locations.

$$T_{ij}(s) = \frac{\sum_{k=1}^{N} H_{ik}(s)F_k(s)}{\sum_{k=1}^{N} H_{jk}(s)F_k(s)} \qquad \text{formula (1)}$$

where $H_{ik}(s)$ and $H_{jk}(s)$ are transfer functions, and the transfer function is shown in formula (2) (taking $H_{ik}(s)$ as an example).

$$H_{ik}(s) = \sum_{r=1}^{N} \left( \frac{\phi_{ir} L_{kr}}{i\omega - \lambda_r} + \frac{\phi_{ir}^* L_{kr}^*}{i\omega - \lambda_r^*} \right) \qquad \text{formula (2)}$$

where $\varphi$ is the modal vector, L is the modal participation factor, $\lambda$ is the pole of the system, and resonance occurs when $i\omega$ approaches the pole of the system, at which point the aforementioned formula (1) will become the formula (3) described below.

$$\lim_{s \to \lambda_r} T_{ij}(s) = \frac{\sum_{k=1}^{N} \phi_{ir} L_{kr}}{\sum_{k=1}^{N} \phi_{jr} L_{kr}} = \frac{\phi_{ir}}{\phi_{jr}} \qquad \text{formula (3)}$$

Figure 5:
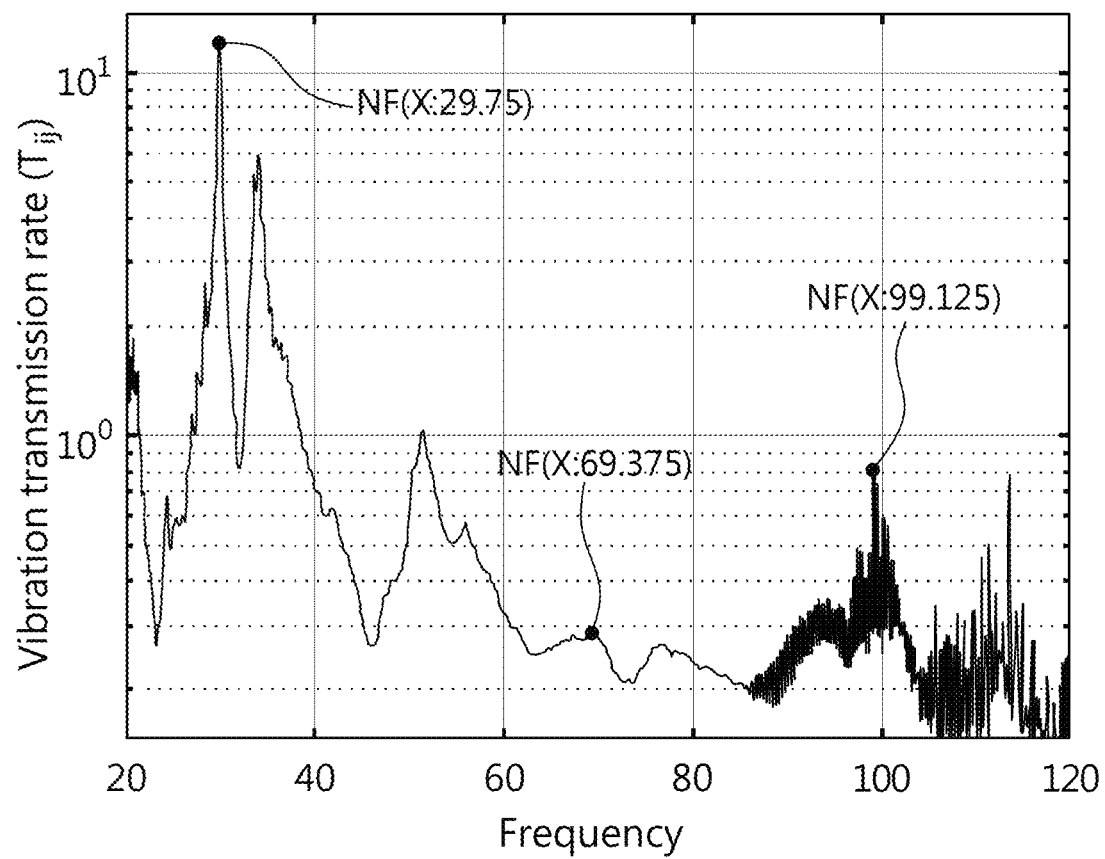
FIG. 5 shows the waveform formed by one vibration transmissibility.

FIG. 5 shows the waveform formed by one vibration transmissibility $T_{ij}$ of a plurality of vibration transmissibilities $T_{ij}$ with respect to different frequencies. In FIG. 5, there are three natural frequencies NF of 29.75 Hz, 69.37 Hz, and 99.12. The remaining natural frequencies may appear in the troughs in FIG. 5, or cannot be detected due to node effects, so the following singular value decomposition is also needed for processing.

The procedure (SS2) singular value decomposition is: combining the plurality of vibration transmissibilities $T_{ij}$ into a vibration transmissibility matrix as shown in the following formula (4), and then using the singular value decomposition method to decompose the vibration transmissibility matrix by the following formula (5) so as to obtain the singular value of the vibration transmissibility matrix.

$$T(s) = \begin{bmatrix} T_{12}^1(s) & T_{12}^2(s) & \cdots & T_{12}^k(s) \\ T_{13}^1(s) & T_{13}^2(s) & \cdots & T_{13}^k(s) \\ \vdots & \vdots & \ddots & \vdots \\ T_{ij}^1(s) & T_{ij}^2(s) & \cdots & T_{ij}^k(s) \\ 1 & 1 & \cdots & 1 \end{bmatrix} \qquad \text{formula (4)}$$

$$T(s) = U(s)\Sigma(s)V^T(s) \qquad \text{formula (5)}$$

where U and V are unit orthogonal matrices, $\Sigma$ is an oblique diagonal matrix, and $\Sigma(s)$ is as shown in formula (6).

$$\Sigma(s) = \begin{bmatrix} \sigma_1(s) & 0 & \cdots & 0 \\ 0 & \sigma_2(s) & \cdots & 0 \\ \vdots & \vdots & \ddots & \vdots \\ 0 & 0 & \cdots & \sigma_k(s) \end{bmatrix} \qquad \text{formula (6)}$$

The diagonal element $\sigma_k(s)$ in the above formula (6) is the singular value.

Figure 6:
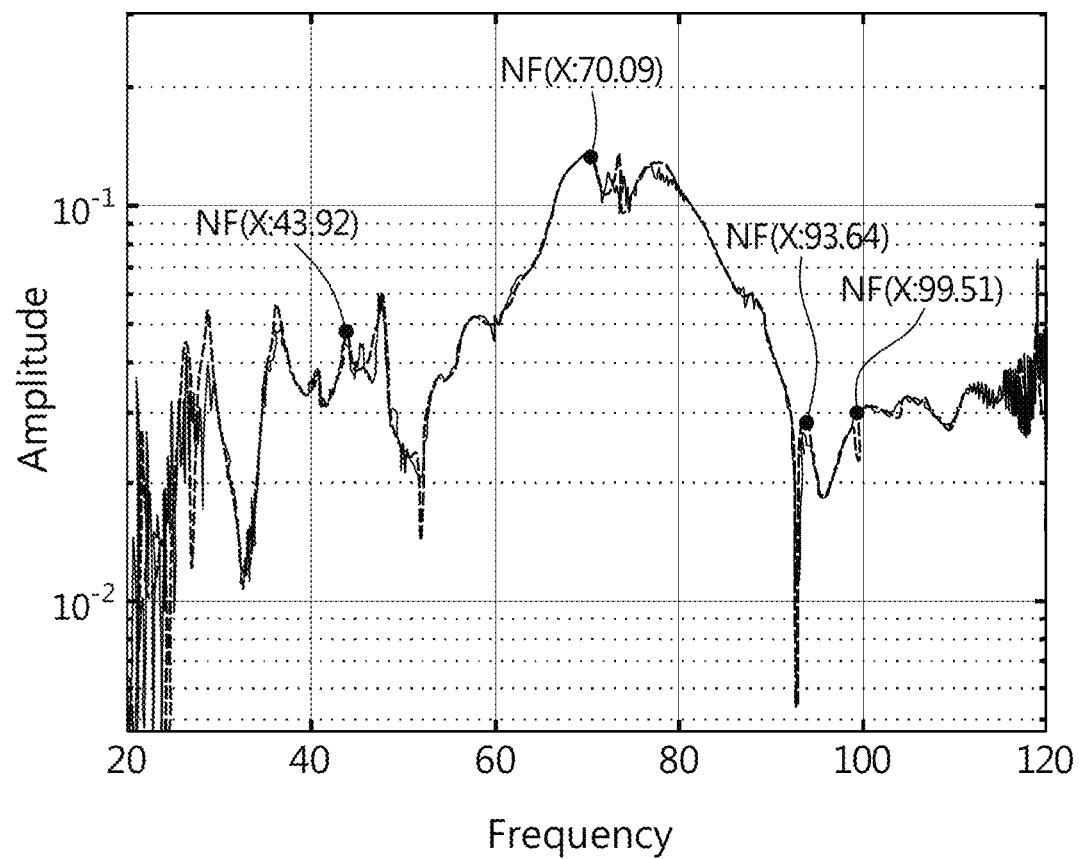
FIG. 6 is a diagram showing the result of the curve fitting procedure according to the present invention.

The procedure (SS3) curve fitting is: taking the reciprocal of $\sigma_2$ in formula (6) and performing a curve fitting procedure and defining the fitted curve as shown in FIG. 6. The multiple peaks are the multiple natural frequencies NF. The curve fitting procedure is a known technique and is well known to those skilled in the art, and therefore will not be further described.

The procedure (SS4) modal establishing is: based on the plurality of natural frequencies NF, establishing a plurality of current modals $\varphi_h$ of the machine tool 90 according to the following formula (7). Each current modal $\varphi_h$ is as shown in the following formula (7).

$$\varphi_h = [-1\ 0\ 1\ 1\ 0]^T \qquad \text{formula (7)}$$

where the foregoing plurality of current modals $\varphi_h$ are defined as a characteristic cluster, and the values of −1, 0, 1, 1, 0, etc. in the aforementioned formula are determined based on the plurality of natural frequencies NF described above. The values may be different when the health status of machine tool 90 changes.

In Step (S02) obtaining a current health characteristic cluster: after a predetermined time has elapsed in the above (S01) step, for example, the machine tool 90 has been used for one year, or moved after being installed, moved to a different place in the factory, or the user thinks that the health status of the machine tool 90 should be viewed again, the electronic device 95 drives the motors of the machine tool 90 to excite the machine tool 90, and the aforementioned diagnostic process D is performed during the excitation process to obtain a characteristic cluster composed of a plurality of modals $\varphi_h$, and the characteristic cluster is defined as a current health characteristic cluster PG.

Figure 7:
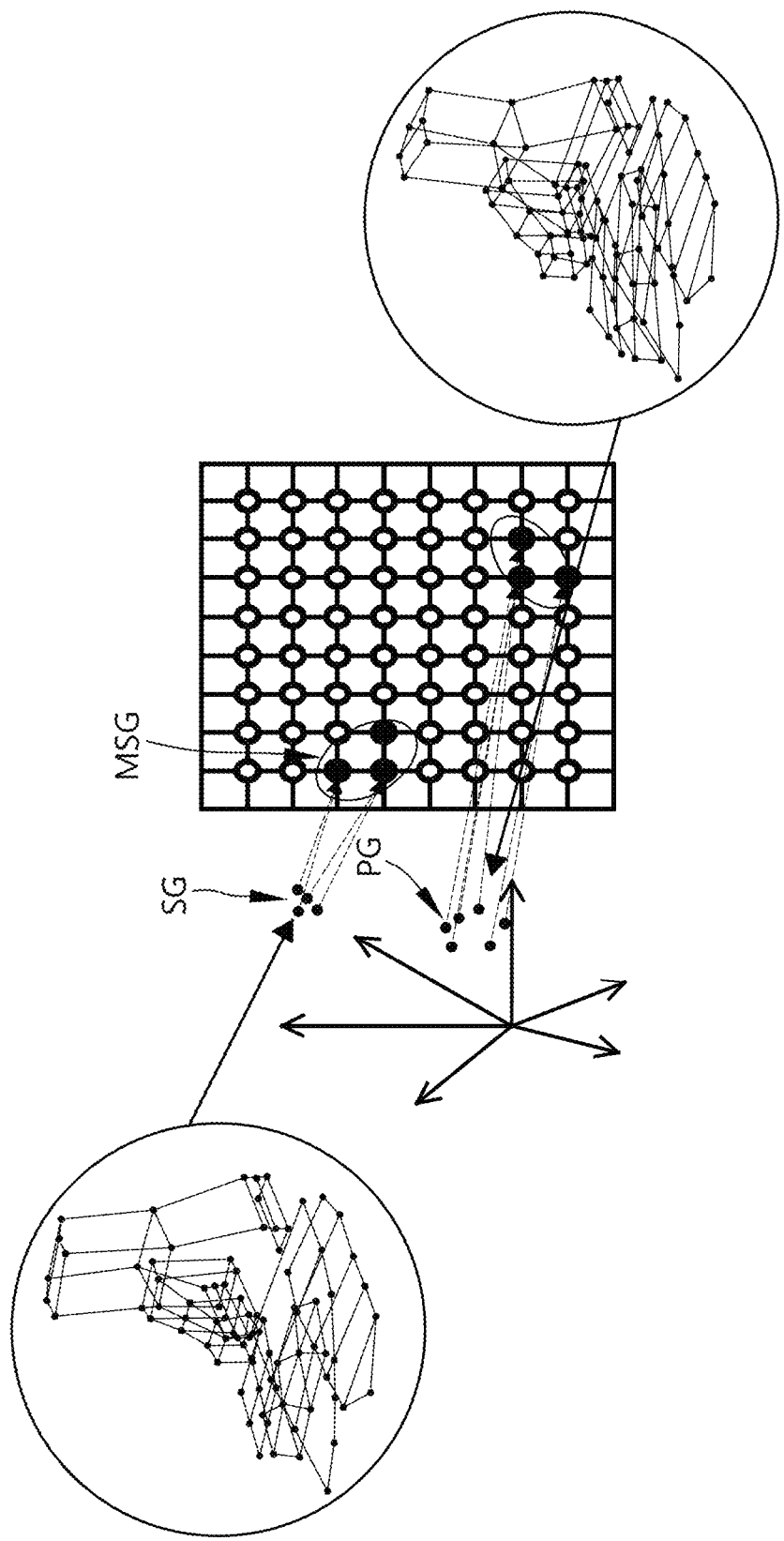
FIG. 7 is a schematic diagram showing the distribution of characteristic clusters in a high-dimensional coordinate system and the distribution state in a two-dimensional coordinate system according to the present invention.

In Step (S03) judging the health status: compare the current health characteristic cluster PG with the sample health characteristic cluster SG, and then judge that the current state of the machine tool 90 is unhealthy when the difference is greater than a safety threshold, otherwise it is judged to be healthy. In more detail, in this step, as shown in FIG. 7, each of the modals in the current healthy characteristic cluster PG and the sample health characteristic cluster SG may be represented in a high-dimensional coordinate in a point, and then use the machine learning method of self-organizing map (SOM) to map the points in the high-dimensional coordinate system to a two-dimensional coordinate system to form a plurality of projection points on the two-dimensional coordinate system corresponding to the current health characteristic cluster PG that are defined as a current projection cluster MPG, and also to form a plurality of projection points on the two-dimensional coordinate system corresponding to the sample health characteristic cluster SG that are defined as a sample projection cluster MSG. As for the aforementioned safety threshold state, the distance is used to represent and become the safety threshold distance. The machine tool 90 is determined to be healthy by obtaining whether the distance between the center point of the current projection cluster MPG and the center point of the sample projection cluster MSG is greater than the safety threshold distance. However, the self-organizing map (SOM) described above is a known machine learning technique, and the present invention is not intended to be limited to this technology. Other methods of comparison, such as isolation forest, K-means and gaussian mixture model, are also covered by the patent scope of the present invention.

Through the above steps, the user can execute the diagnostic process D to obtain the sample health characteristic cluster SG when the machine tool 90 is in a healthy state. After that, if there may be concerns about the health status after the machine tool 90 has moved or has a large degree of reorganization or replacement of parts, perform the diagnostic process D to obtain the current health characteristic cluster PG. Thereafter, compare the current health characteristic cluster PG with the sample health characteristic cluster SG, and then use the comparison result to determine whether the current machine tool 90 is in a healthy state.

In addition, since different temperature conditions such as thermal expansion and contraction or other reasons may cause changes in the health status of the machine tool 90, in the case where the temperature may change, it is necessary to establish the sample health characteristic cluster SG at different temperatures in order to compare the current health characteristic cluster PG obtained under different temperature conditions. As for the occasion where the temperature does not change, such as a constant temperature plant, there is no such need. To perform the step of obtaining the sample health characteristic cluster SG when the temperature may change, preset a plurality of target temperatures, for example, each degree between 25-35 degrees Celsius, and control the ambient temperature of the machine tool 90 at each of the target temperatures. When the ambient temperature is at each of the target temperatures, the electronic device 95 drives the motors of the machine tool 90 to excite the machine tool 90. The diagnostic process D is executed once during the excitation process, so that a corresponding characteristic cluster is respectively obtained at different temperatures, thereby obtaining a plurality of characteristic clusters corresponding to different target temperatures. In the step of obtaining the current health characteristic cluster PG, the temperature of the acquisition process is recorded and defined as the current temperature. In the step of judging the health status, the current health characteristic cluster PG is compared with the characteristic cluster corresponding to the current temperature in the sample health characteristic cluster SG. Thereby, the current health characteristic cluster PG and the sample health characteristic cluster SG can be compared with the same ambient temperature, thereby achieving a more accurate judgment result.

As can be seen from the above, the present invention can perform the excitation of the machine tool 90 by using the motor devices of the machine tool 90 itself, and can extract the vibration transmissibility $T_{ij}$, the natural frequency NF, and the modal health characteristics without manual excitation, and can then determine the health status of the machine tool 90.

What is claimed is:

1. A machine tool health monitoring method, comprising the steps of obtaining a sample health characteristic cluster, obtaining a current health characteristic cluster and judging health status, the step of obtaining a sample health characteristic cluster being to use a predetermined plurality of vibration sensors on a plurality of components of a machine tool and to drive motors of said machine tool to excite said machine tool using an electronic device while the health status of said machine tool is good, and then to perform a diagnostic process during a excitation process so as to obtain a characteristic cluster consisting of a plurality of modals, and then to define said characteristic cluster as a sample health characteristic cluster, said diagnostic process comprising a vibration transmissibility obtaining procedure, a singular value decomposition procedure, a curve fitting procedure and a modal establishing procedure, wherein:

said vibration transmissibility obtaining procedure is to use said electronic device to read the data sensed by said plurality of vibration sensors every predetermined period of time, and to calculate the multiple vibration transmissibilities $T_{ij}$ measured by said plurality of vibration sensors according to formula (1), where i and j respectively represent said vibration sensors installed in different locations, $$T_{ij}(s) = \frac{\sum_{k=1}^{N} H_{ik}(s)F_k(s)}{\sum_{k=1}^{N} H_{jk}(s)F_k(s)} \quad \text{formula (1)}$$

where k refers to different dimensions of a coordination system of the machine tool, N is a maximum of k, $H_{ik}(s)$ and $H_{jk}(s)$ are transfer functions, $F_k(s)$ is an external force applied to the machine tool, and the transfer function $H_{ik}(s)$ is calculated by formula (2), $$H_{ik}(s) = \sum_{r=1}^{N} \left( \frac{\phi_{ir}L_{kr}}{i\omega - \lambda_r} + \frac{\phi_{ir}^* L_{kr}^*}{i\omega - \lambda_r^*} \right) \quad \text{formula (2)}$$

where r is a different pole of mode shapes of a system of the machine tool, ω is the modal vector, L is the modal participation factor, λ is the pole of the system, and resonance occurs when iω approaches the pole of the system, at which point the said formula (1) will become formula (3) described below:

$$\lim_{s \to \lambda_r} T_{ij}(s) = \frac{\sum_{k=1}^{N} \phi_{ir}L_{kr}}{\sum_{k=1}^{N} \phi_{jr}L_{kr}} = \frac{\phi_{ir}}{\phi_{jr}}; \quad \text{formula (3)}$$

said singular value decomposition procedure is to combine said plurality of vibration transmissibilities $T_{ij}$ into a vibration transmissibility matrix according to formula (4), and then to use the singular value decomposition method to decompose said vibration transmissibility matrix by formula (5) so as to obtain the singular value of said vibration transmissibility matrix, $$T(s) = \begin{bmatrix} T_{12}^1(s) & T_{12}^2(s) & \cdots & T_{12}^k(s) \\ T_{13}^1(s) & T_{13}^2(s) & \cdots & T_{13}^k(s) \\ \vdots & \vdots & \ddots & \vdots \\ T_{ij}^1(s) & T_{ij}^2(s) & \cdots & T_{ij}^k(s) \\ 1 & 1 & \cdots & 1 \end{bmatrix} \quad \text{formula (4)}$$

$$T(s) = U(s)\Sigma(s)V^T(s) \quad \text{formula (5)}$$

where U and V are unit orthogonal matrices, Σ is an oblique diagonal matrix, and Σ(s) is defined according to formula (6), $$\Sigma(s) = \begin{bmatrix} \sigma_1(s) & 0 & \cdots & 0 \\ 0 & \sigma_2(s) & \cdots & 0 \\ \vdots & \vdots & \ddots & \vdots \\ 0 & 0 & \cdots & \sigma_k(s) \end{bmatrix} \quad \text{formula (6)}$$

where the diagonal element $\sigma_k(s)$ in the above formula (6) is the singular value;

said curve fitting procedure is to take the reciprocal of $\sigma_2$ in formula (6) and to perform a curve fatting procedure and then to define the multiple peaks of the fitted curve as natural frequencies;

said modal establishing procedure is based on said plurality of natural frequencies to establish a plurality of current modals $\varphi_h$ of said machine tool according to formula (7), each said current modal taking a $\varphi_h$ as an example, formula (7), each said current modal taking a $\omega_h$ as an example, $$\varphi_h = [-1 \ 0 \ 1]^T \quad \text{formula (7)}$$

where said plurality of current modals $\omega_h$ are defined as a characteristic cluster;

the step of obtaining a current health characteristic cluster is to use said electronic device to drive the motors of said machine tool for exciting said machine tool after a predetermined time has elapsed in the step of obtaining a sample health characteristic cluster and then to perform said diagnostic process during the excitation process so as to obtain a characteristic cluster composed of a plurality of modals $\omega_h$, and then to define said characteristic cluster as a current health characteristic cluster;

the step of judging the health status is to compare said current health characteristic cluster with said sample health characteristic cluster, and to determine that the current state of said machine tool is unhealthy when the difference is greater than a safety threshold, otherwise the current state of said machine tool is judged to be healthy.

2. The machine tool health monitoring method as claimed in claim 1, wherein the step of judging the health status is to represent each of said modals in said current healthy characteristic cluster and said sample health characteristic cluster in a high-dimensional coordinate in a point, and then to use the machine learning method of self-organizing map (SOM) to map the points in said high-dimensional coordinate system to a two-dimensional coordinate system to form a plurality of projection points on said two-dimensional coordinate system corresponding to said current health characteristic cluster that are defined as a current projection cluster, and also to form a plurality of projection points on said two-dimensional coordinate system corresponding to said sample health characteristic cluster that are defined as a sample projection cluster; said safety threshold is represented by a safety threshold distance, and said machine tool is judged to be healthy by obtaining whether the distance between the center point of said current projection cluster and the center point of said sample projection cluster is greater than said safety threshold distance.

3. The machine tool health monitoring method as claimed in claim 1, wherein the step of obtaining a sample health characteristic cluster is to preset a. plurality of target temperatures and to control the ambient temperature of said machine tool at each of said target temperatures, and then to drive the motors of said machine tool to excite said machine tool by using said electronic device when the ambient temperature of said machine tool is at each of said target temperatures, and then to perform said diagnostic process once during the excitation process, so that a corresponding characteristic cluster is respectively obtained at different temperatures, thereby obtaining a plurality of characteristic clusters corresponding to different target temperatures; the step of obtaining a current health characteristic cluster is to record the temperature of the acquisition process and defines the recorded temperature as the current temperature; the step of judging the health status is to compare said current health characteristic cluster with the characteristic cluster corresponding to the current temperature in said sample health characteristic cluster.

* * * * *